US011588690B2

(12) United States Patent
Wilson et al.

(10) Patent No.: US 11,588,690 B2
(45) Date of Patent: *Feb. 21, 2023

(54) TECHNIQUES FOR DYNAMICALLY MODIFYING OPERATIONAL BEHAVIOR OF NETWORK DEVICES IN A WIRELESS NETWORK (71) Applicant: ITRON, INC., Liberty Lake, WA (US)

(72) Inventors: Ryan Matthew Wilson, Rolesville, NC (US); Eric Donald White, Seneca, SC (US); Kevin Richard Crouse, Seneca, SC (US)

(73) Assignee: ITRON, INC., Liberty Lake, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/543,482

(22) Filed: Dec. 6, 2021

(65) Prior Publication Data

US 2022/0094598 A1 Mar. 24, 2022

Related U.S. Application Data (63) Continuation of application No. 16/237,251, filed on Dec. 31, 2018, now Pat. No. 11,212,172.

(51) Int. Cl.
H04L 41/0816 (2022.01)
H04L 43/16 (2022.01)
(Continued)

(52) U.S. Cl.
CPC ...... *H04L 41/0816* (2013.01); *H04L 41/0893* (2013.01); *H04L 41/20* (2013.01); *H04L 43/16* (2013.01)

(58) Field of Classification Search
CPC . H04L 41/0816; H04L 41/0893; H04L 41/20; H04L 43/16; H04L 43/08; H04L 43/0829; H04L 43/0888; H04L 43/0894
See application file for complete search history.

(56) References Cited

U.S. PATENT DOCUMENTS 7,447,760 B2 * 11/2008 Forth ............... G01D 4/004
714/6.32
7,650,425 B2 1/2010 Davis et al.
(Continued)

FOREIGN PATENT DOCUMENTS

WO 2016/096978 A1 6/2016

*Primary Examiner* — Javier O Guzman
(74) *Attorney, Agent, or Firm* — Artegis Law Group, LLP (57) ABSTRACT A network device includes one or more processors and a memory storing firmware that when executed by the one or more processors causes the network device to perform operations including executing the firmware according to a configuration file, wherein the executing includes receiving one or more commands updating the configuration file to become a modified configuration file; and executing the firmware according to the modified configuration file. Wherein executing the firmware according to the modified configuration file includes: extracting a mode from the modified configuration file, the mode indicating a condition, a set of parameters, and a rule mapping the condition to an action; evaluating the condition based on one or more parameter values associated with the set of parameters; and in response to determining that the condition has been met, performing the action, wherein performing the action modifies how a resource is distributed at a location.

20 Claims, 4 Drawing Sheets (51) Int. Cl.
 *H04L 41/00* (2022.01)
 *H04L 41/0893* (2022.01)

(56) References Cited

U.S. PATENT DOCUMENTS

| | | | |
|---|---|---|---|
| 8,255,090 B2 | 8/2012 | Frader-Thompson et al. | |
| 8,560,134 B1 | 10/2013 | Lee | |
| 10,028,355 B1 | 7/2018 | Hancock et al. | |
| 10,320,576 B1 | 6/2019 | Butler et al. | |
| 10,645,576 B1 | 5/2020 | Deshmukh et al. | |
| 2004/0215976 A1 | 10/2004 | Jain | |
| 2008/0271118 A1 | 10/2008 | Greenlaw | |
| 2009/0198384 A1* | 8/2009 | Ahn | H02J 13/00016 700/295 |
| 2010/0321587 A1 | 12/2010 | Kerofsky | |
| 2011/0061014 A1 | 3/2011 | Frader-Thompson et al. | |
| 2011/0270453 A1 | 11/2011 | Kalogridis et al. | |
| 2011/0271352 A1 | 11/2011 | Kalogridis et al. | |
| 2012/0026898 A1 | 2/2012 | Sen et al. | |
| 2012/0047578 A1 | 2/2012 | Lee et al. | |
| 2012/0053739 A1* | 3/2012 | Brian | G06F 1/3203 700/287 |
| 2012/0166008 A1* | 6/2012 | Jeong | H02J 13/00002 700/295 |
| 2012/0173252 A1 | 7/2012 | Mak et al. | |
| 2012/0197455 A1 | 8/2012 | Lee et al. | |
| 2012/0198551 A1 | 8/2012 | Whitney | |
| 2012/0232915 A1* | 9/2012 | Bromberger | G01D 4/004 705/1.1 |
| 2013/0103215 A1* | 4/2013 | Dai | G06Q 50/06 700/291 |
| 2013/0173243 A1 | 7/2013 | Kayton et al. | |
| 2013/0262197 A1 | 10/2013 | Kaulgud et al. | |
| 2013/0345884 A1 | 12/2013 | Forbes, Jr. | |
| 2014/0214729 A1* | 7/2014 | Lin | H04L 69/04 705/412 |
| 2015/0256435 A1 | 9/2015 | Sum et al. | |
| 2016/0345080 A1* | 11/2016 | Saikusa | H04Q 9/00 |
| 2017/0019809 A1 | 1/2017 | Saikusa | |
| 2017/0134395 A1 | 5/2017 | Enns et al. | |
| 2018/0372507 A1* | 12/2018 | Luan | G01D 4/004 |

\* cited by examiner

TECHNIQUES FOR DYNAMICALLY MODIFYING OPERATIONAL BEHAVIOR OF NETWORK DEVICES IN A WIRELESS NETWORK

CROSS-REFERENCE TO RELATED APPLICATIONS

The present application is a continuation of United States application titled "TECHNIQUES FOR DYNAMICALLY MODIFYING OPERATIONAL BEHAVIOR OF NETWORK DEVICES INA WIRELESS NETWORK," filed on Dec. 31, 2018, and having Ser. No. 16/237,251. The subject matter of this related application is hereby incorporated herein by reference.

BACKGROUND

Field of the Various Embodiments

Embodiments of the present invention relate generally to wireless networks and, more specifically, to techniques for dynamically modifying operational behavior of network devices in a wireless network.

Description of the Related Art

A conventional utility distribution infrastructure typically includes multiple consumers, such as households and businesses, coupled to a set of intermediate distribution entities. The set of intermediate distribution entities draws resources from upstream providers and distributes those resources to the downstream consumers. In a modern utility distribution infrastructure, the consumers as well as the intermediate distribution entities may include various network devices, such as smart utility meters, that are networked together to form a wireless network. The network devices monitor the distribution of resources via the utility distribution infrastructure in real time to generate metrology data. The metrology data is periodically reported across the wireless network to a utility provider that owns and/or operates the utility distribution infrastructure.

In addition to generating and reporting metrology data, a given network device within the wireless network also can typically analyze the metrology data to detect specific events that affect the distribution of resources across the utility distribution infrastructure and/or the consumption of those resources. When such an event is detected, the given network device may initiate a pre-programmed corrective action to mitigate the event. For example, when monitoring the distribution of natural gas to a factory, a smart gas meter could measure the pressure of the natural gas in real time and detect that the pressure of the natural gas exceeds a maximum pressure level. In response, the smart gas meter could terminate the flow of gas to the factory, thereby mitigating any dangers caused by distributing high-pressure natural gas across the relevant infrastructure.

The operational behavior of the individual network devices within the wireless network is generally determined by a control center that operates as a third-party service provider to the utility provider. The control center oversees the operation of the wireless network relative to the utility distribution infrastructure and configures each network device to perform, among other things, the various operations described above. In particular, the control center configures each network device to execute a firmware application to generate and report metrology data and to detect and respond to specific events.

In some cases, the control center configures the network devices within the wireless network according to various feature requests received from the utility provider. These feature requests typically indicate desired changes to the default and/or existing behavior of the network devices. For example, the network devices could be configured by default to disconnect electricity from any residence where the instantaneous amperage of the electricity exceeds a threshold value. The utility provider could request a new feature where the electricity is only disconnected when the instantaneous amperage of the electricity exceeds a threshold value for a threshold duration of time. In response, the control center would initiate a firmware update to cause the network devices to perform the desired behavior of disconnecting electricity when the instantaneous amperage of the electricity exceeds the threshold value for the threshold amount of time. As a general matter, the control center updates network device firmware any time the operational behavior of the network devices needs to be modified.

One drawback of the above approach is that updating the firmware for a given network device requires that the network device be brought offline and then rebooted to initiate execution of the updated firmware. During this process, the given network device cannot generate or report metrology data, thereby preventing the control center from monitoring the distribution and/or consumption of resources proximate to where the network device is deployed. In addition, when brought offline, the given network device cannot detect and respond to events that occur proximate to where that network device is deployed. Therefore, the given network device cannot take corrective action to mitigate those events.

Another drawback of the above approach is that generating a firmware update for a given network device involves writing code, which can cause the control center to incur substantial overhead. Among other things, one or more engineers associated with the control center typically have to interact with the utility provider to determine customer requirements. The engineers then have to translate the customer requirements into engineering requirements and write code that meets those engineering requirements. Finally, the newly-written code also has to be tested before being deployed to the network devices.

Yet another drawback of the above approach is that different types of network devices oftentimes execute different types of firmware that cannot be universally updated via a common firmware update. For example, suppose a battery-powered network device were to execute one type of firmware that coordinates intermittent communications to conserve battery power, while a mains-powered device were to execute another type of firmware that supports continuous communications. A firmware update designed for the battery-powered network device would likely be incompatible with the mains-powered device (and vice versa) because the two types of firmware executed by these devices would be designed for different hardware and to achieve different purposes. Thus, in situations where the wireless network includes multiple different types of network devices, the control center has to generate a different firmware update for each different type of network device. Generating just one firmware update can be quite costly, as noted above. Generating multiple firmware updates compounds those costs.

Yet another drawback of the above approach is that utility providers frequently make feature requests to continuously improve how resources are distributed across the utility distribution infrastructure. In an effort to provide good customer service and remain competitive, the control center needs to proactively respond to these feature requests by frequently generating and deploying firmware updates. However, for the reasons discussed above, generating and deploying firmware updates impedes overall network functionality and incurs significant overhead. These issues are compounded when frequent firmware updates are needed.

As the foregoing illustrates, what is needed in the art is a more effective way to modify the operational behavior of a device included in a wireless network.

SUMMARY

Some embodiments include a computer-implemented method for modifying one or more operational characteristics of a node, including generating a first mode based on a first configuration file, wherein the first mode includes a first set of parameters and a first set of rules, generating a first condition based on the first set of parameters, determining that the first condition has been met based on first sensor data indicating an occurrence of a first event, wherein the first event is associated with distributing a resource at a first location, determining a first action corresponding to the first condition based on the first set of rules, and executing the first action to cause the node to perform one or more operations that modify how the resource is distributed at the first location in order to mitigate the first event.

One technological advantage of the disclosed approach is that the operational behavior of the node can be modified without bringing the node offline. Accordingly, the node can be configured to detect a variety of different events and respond with a variety of different actions while continuing to operate.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

As noted above, a modern utility distribution infrastructure may include network devices that are configured to monitor and coordinate the distribution of resources at various locations. A given network device monitors the distribution of resources at a given location to generate metrology data, and then periodically reports the metrology data to a control center across a wireless network. In addition, the given network device analyzes the metrology data in real time to detect, and then respond to, specific types of events. Network devices can be configured to detect and respond to different types of events by updating the firmware executed by those devices. However, updating network device firmware is problematic for several reasons.

First, network devices must be brought offline and rebooted in order initiate the execution of new or updated firmware. During this time, those devices cannot generate or report metrology data and cannot detect or respond to events, potentially leading to unmitigated and potentially hazardous situations. Second, updating the firmware of network devices incurs overhead for the control center. Among other things, one or more programmers employed by the control center typically need to generate new code to modify and/or update the network device firmware. Third, different network devices oftentimes need different firmware updates, leading to situations where multiple firmware updates have to be generated to add a common set of features across different network devices. Finally, utility providers often request new features frequently. Consequently, network device firmware oftentimes must be updated periodically to satisfy customer requests, thereby compounding the three issues described above.

To address these issues, embodiments of the invention include a technique for dynamically modifying the operational behavior of a node. The node includes a firmware application that analyzes sensor data to detect and respond to one or more events associated with the distribution of resources. During execution, the firmware application reads a configuration file that specifies a set of conditions. A given condition can be evaluated based on the sensor data to detect the occurrence of a corresponding event. The configuration file also specifies different actions that should be performed in response to different detected events. The configuration file can by dynamically updated during execution of the firmware application to modify the set of conditions the firmware application evaluates and the different actions to be performed when occurrences of specific events are detected. In addition, different versions of the firmware application that execute on different types of nodes can be configured based on one type of configuration file in order to apply similar modifications to the operational behavior of those different types of nodes. Accordingly, many different types of nodes can be dynamically updated to perform similar operations without needing to generate and deploy multiple firmware updates.

Figure 1:
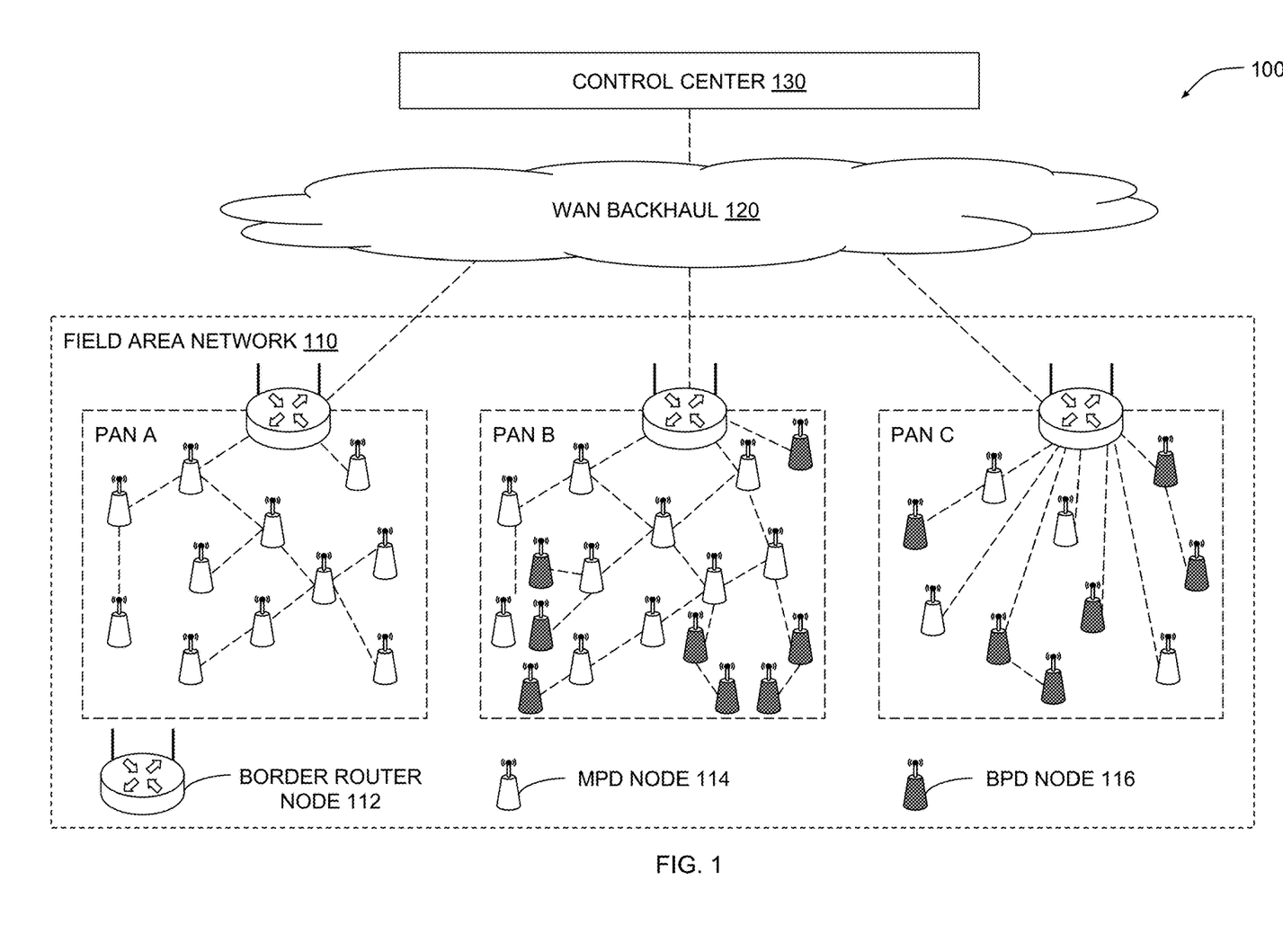
FIG. 1 illustrates a network system configured to implement one or more aspects of the present embodiments.

One technological advantage of the disclosed approach is that the operational behavior of the node can be modified without bringing the node offline. Accordingly, the node can be configured to detect a variety of different events and respond with a variety of different actions while continuing to operate. Another technological advantage of the disclosed approach is that the operational behavior of the node can be modified without needing to generate a firmware update. Accordingly, the overhead typically associated with generating firmware updates can be largely reduced. Yet another technological advantage of the disclosed approach is that different types of firmware associated with different network devices can be configured based on one type of configuration file, thereby avoiding situations where different types of devices need to be configured separately to implement the same set of features. Yet another technological advantage of the disclosed approach is that the control center can respond to customer feature requests quickly, given the simplicity with which node behavior can be modified. These technological advantages represent multiple technological advancements relative to prior art approaches System Overview FIG. 1 illustrates a network system configured to implement one or more aspects of the present embodiments. As shown, network system 100 includes a field area network (FAN) 110, a wide area network (WAN) backhaul 120, and a control center 130. FAN 110 is coupled to control center 130 via WAN backhaul 120. Control center 130 is configured to coordinate the operation of FAN 110.

FAN 110 includes personal area network (PANs) A, B, and C. PANs A and B are organized according to a mesh network topology, while PAN C is organized according to a star network topology. Each of PANs A, B, and C includes at least one border router node 112 and one or more mains-powered device (MPD) nodes 114. PANs B and C further include one or more battery-powered device (BPD) nodes 116.

MPD nodes 114 draw power from an external power source, such as mains electricity or a power grid. MPD nodes 114 typically operate on a continuous basis without powering down for extended periods of time. BPD nodes 116 draw power from an internal power source, such as a battery. BPD nodes 116 typically operate intermittently and power down for extended periods of time in order to conserve battery power.

MPD nodes 114 and BPD nodes 116 are coupled to, or included within, a utility distribution infrastructure (not shown) that distributes a resource to consumers. MPD nodes 114 and BPD nodes 116 gather sensor data related to the distribution of the resource, process the sensor data, and communicate processing results and other information to control center 130. Border router nodes 112 operate as access points to provide MPD nodes 114 and BPD nodes 116 with access to control center 130.

Any of border router nodes 112, MPD nodes 114, and BPD nodes 116 are configured to communicate directly with one or more adjacent nodes via bi-directional communication links. The communication links may be wired or wireless links, although in practice, adjacent nodes of a given PAN exchange data with one another by transmitting data packets via wireless radio frequency (RF) communications. The various node types are configured to perform a technique known in the art as "channel hopping" in order to periodically receive data packets on varying channels. As known in the art, a "channel" may correspond to a particular range of frequencies. In one embodiment, a node may compute a current receive channel by evaluating a Jenkins hash function based on a total number of channels and the media access control (MAC) address of the node.

Each node within a given PAN may implement a discovery protocol to identify one or more adjacent nodes or "neighbors." A node that has identified an adjacent, neighboring node may establish a bi-directional communication link with the neighboring node. Each neighboring node may update a respective neighbor table to include information concerning the other node, including the MAC address of the other node as well as a received signal strength indication (RSSI) of the communication link established with that node.

Nodes may compute the channel hopping sequences of adjacent nodes to facilitate the successful transmission of data packets to those nodes. In embodiments where nodes implement the Jenkins hash function, a node computes a current receive channel of an adjacent node using the total number of channels, the MAC address of the adjacent node, and a time slot number assigned to a current time slot of the adjacent node.

Any of the nodes discussed above may operate as a source node, an intermediate node, or a destination node for the transmission of data packets. A given source node may generate a data packet and then transmit the data packet to a destination node via any number of intermediate nodes (in mesh network topologies). The data packet may indicate a destination for the packet and/or a particular sequence of intermediate nodes to traverse in order to reach the destination node. In one embodiment, each intermediate node may include a forwarding database indicating various network routes and cost metrics associated with each route.

Nodes may transmit data packets across a given PAN and across WAN backhaul 120 to control center 130. Similarly, control center 130 may transmit data packets across WAN backhaul 120 and across any given PAN to a particular node included therein. As a general matter, numerous routes may exist which traverse any of PANs A, B, and C and include any number of intermediate nodes, thereby allowing any given node or other component within network system 100 to communicate with any other node or component included therein.

Control center 120 includes one or more server machines (not shown) configured to operate as sources for, or destinations of, data packets that traverse within network system 100. The server machines may query nodes within network system 100 to obtain various data, including raw or processed sensor data, power consumption data, node/network throughput data, status information, and so forth. The server machines may also transmit commands and/or program instructions to any node within network system 100 to cause those nodes to perform various operations. In one embodiment, each server machine is a computing device configured to execute, via a processor, a software application stored in a memory to perform various network management operations.

Figure 2:
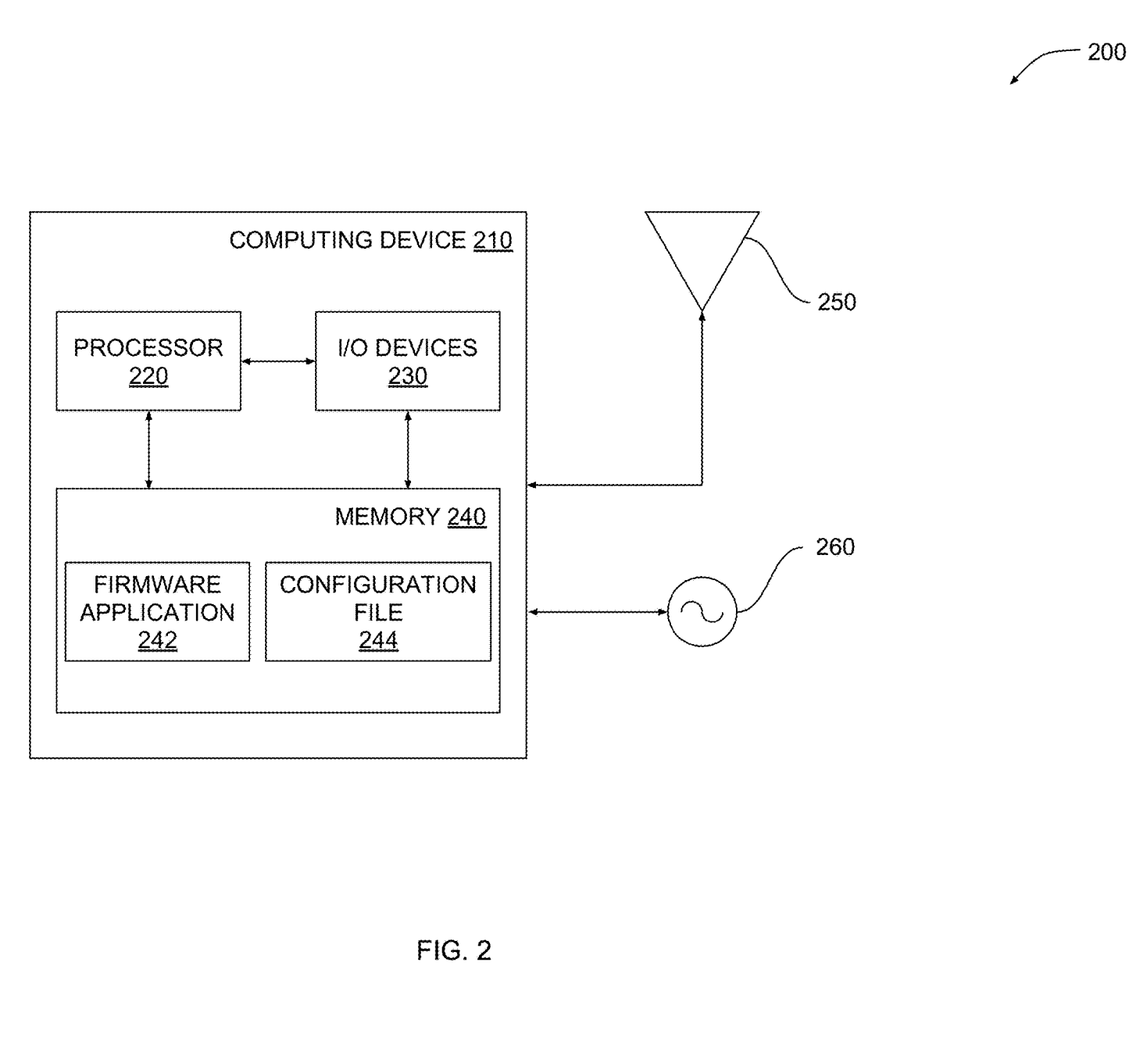
FIG. 2 illustrates a network subsystem configured to transmit and receive data within the wireless network of FIG. 1, according to various embodiments.

Nodes may likewise include computing device hardware configured to perform processing operations and execute program code. Each node may further include various analog-to-digital and digital-to-analog converters, digital signal processors (DSPs), harmonic oscillators, transceivers, and any other components generally associated with RF-based communication hardware. FIG. 2 illustrates an exemplary network subsystem that may be included in any of the nodes of network system 100.

FIG. 2 illustrates a network subsystem configured to transmit and receive data within the wireless network of FIG. 1, according to various embodiments. Network subsystem 200 can be included in any of border router nodes 112, MPD nodes 114, and BPD nodes 116.

As shown, network subsystem 200 includes a computing device 210 coupled to a transceiver 250 and an oscillator 260. Computing device 210 coordinates the operations of a node that includes network subsystem 200. Transceiver 250 is configured to transmit and receive data packets across network system 100 using a range of channels and power levels. Oscillator 260 provides one or more oscillation signals according to which the transmission and reception of data packets can be scheduled.

Computing device 210 includes a processor 220, input/output (I/O) devices 230, and memory 240, coupled together. Processor 220 may include any hardware configured to process data and execute software applications. Processor 220 may include real-time clock (RTC) (not shown) according to which processor 220 maintains an estimate of the current time. I/O devices 230 include devices configured to receive input, devices configured to provide output, and devices configured to both receive input and provide output. Memory 240 may be implemented by any technically feasible storage medium.

Memory 240 includes a firmware application 242 and configuration (config) file 244. Firmware application 242 includes program code that, when executed by processor 220, performs any of the node-oriented computing functionality described herein, including the discovery process discussed above in conjunction with FIG. 1. During discovery, firmware application 242 interfaces with transceiver 250 to coordinate the exchange of data packets with other nodes across network system 100 based on timing signals generated by oscillator 260. Once the discovery process is complete, firmware application 242 causes the node to initiate normal operations.

In the course of normal operations, firmware application 242 generates metrology data based on real-time time sensor data that is captured via I/O devices 230 and related to the distribution of one or more resources. For example, suppose network subsystem 200 resides within a node that is configured as an electricity meter and coupled to a power line. Firmware application 242 could generate voltage time series data based on real-time voltage information captured from a voltage sensor. The voltage sensor could be included in I/O devices 230 and coupled to the power line. Firmware application 242 is capable of generating metrology data based on any technically feasible type of sensor data associated with the distribution of any type of resource, including traditional utilities such as water, gas, and electricity, as well as computer-oriented resources such as bandwidth and network traffic, among others.

Firmware application 242 processes the metrology data to detect the occurrence of various different events. The various events generally relate to the distribution of a resource, such as the exemplary resources mentioned above. Upon detecting a specific event, firmware application 242 executes a corresponding action in response. The executed action may serve to mitigate the event. For example, firmware application 242 could process metrology data related to the distribution of water. Firmware application 242 could monitor the volume of water distributed over a 24-hour time interval and then determine that the distributed amount exceeds a threshold. In response, firmware application 242 could close a water valve to prevent the additional distribution of water. In this example, the excessive distribution of water could be related to a burst pipe that could potentially cause water damage. Firmware application 242 closes the water valve to mitigate this potentially hazardous situation.

Firmware application 242 can be configured and/or reconfigured to detect different events based on configuration file 244. In addition, firmware application 242 can be configured and/or reconfigured to execute different actions in response to those events based on configuration file 244. Configuration file 244 can be updated in real time during execution of firmware application 242, thereby allowing the operational behavior of firmware application 242 and the node where that firmware executes to be modified without updating firmware application 242. In one embodiment, control center 130 dynamically modifies the operational behavior of firmware application 242 by transmitting one or more commands to firmware application 242 that indicate modifications to configuration file 244. The interoperation between firmware application 242 and configuration file 244 is described in greater detail below in conjunction with FIG. 3.

Dynamically Modifying the Operational Behavior of a Node

Figure 3:
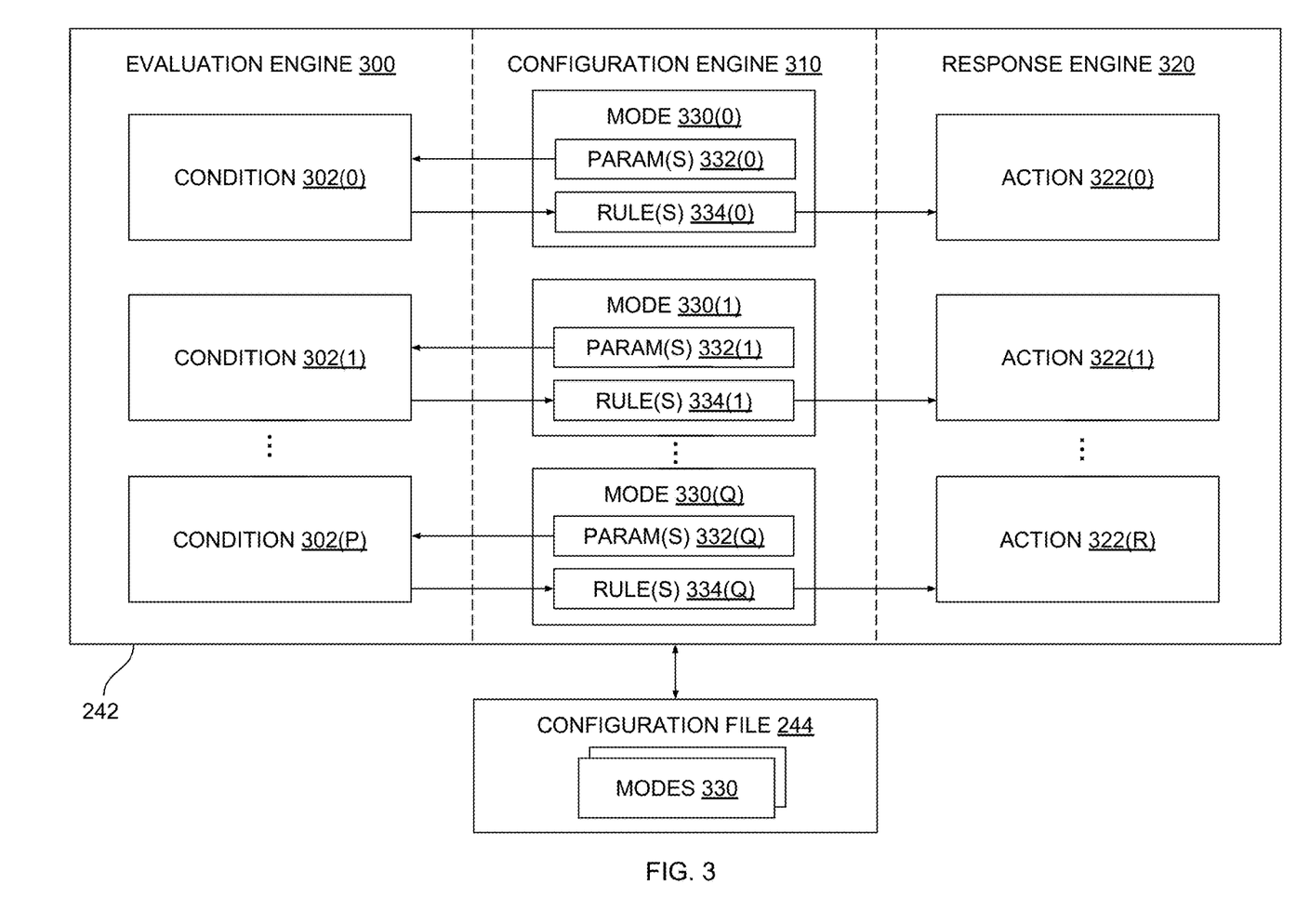
FIG. 3 is a more detailed illustration of the firmware application of FIG. 2, according to various embodiments.

FIG. 3 is a more detailed illustration of the firmware application of FIG. 2, according to various embodiments. As shown, firmware application 242 includes an evaluation engine 300, a configuration engine 310, and a response engine 320. Evaluation engine 300 includes conditions 302. Configuration engine 310 includes modes 330. Response engine 320 includes actions 320. A given mode 330 generally corresponds to at least one condition 302 and at least one action 332.

Each condition 302 includes a mathematical expression that is evaluated based on metrology data generated by the node to detect the occurrence of a specific real-world event. For example, suppose the node is a smart water meter coupled to a water pipe. A given condition 302 could include the expression "A>B," where the value of "A" represents the instantaneous water pressure in the water pipe and the value of "B" is a maximum pressure. The given condition could be evaluated to determine whether the water pressure in the pipe exceeds the maximum pressure value.

Each mode 330 includes one or more parameters (params) 332 used to configure values set forth in the mathematical expression included in a corresponding condition 302. In the above example, the maximum pressure denoted as "B" could be configured with a specific value of 100 pounds per square inch (PSI) based on params 332. Each mode 330 also includes one or more rules 334 used to map the condition 302 corresponding to the given mode 330 to one or more actions 332.

Each action 322 includes one or more commands that are executed to mitigate the specific real-world event. In the above example, if the value of "A" exceeds the value of "B," a given action 322 could be executed to terminate the flow of water through the water pipe, potentially avoiding hazardous situations that could occur due to the distribution of high-pressure water.

In response to receiving configuration file 244, configuration engine 310 analyzes configuration file 244 to extract one or more modes 322. For a given mode 322, configuration engine 310 determines the corresponding condition 302 and configures that condition to include specific parameter values set forth in the associated params 332, as described in the above example. In addition, configuration engine 310 determines the corresponding action 332 based on the associated rules 334 and configures that action to be executed based on evaluation of the associated condition 302, as also described above.

Subsequently, during operation of the node, evaluation engine 300 periodically evaluates conditions 302 in real time based on metrology data captured by the node. The metrology data includes any technically feasible type of measurement related to the distribution of a resource, including voltage measurements, current measurements, pressure measurements, flow rate measurements, temperature measurements, bandwidth measurements, data rate measurements, packet loss measurements, signal-to-noise ratio measurements, and so forth. Based on the evaluation of conditions 302, evaluation engine 300 detects the occurrence of specific real-world events and then triggers response engine 330 to execute one or more actions 322 in response. Response engine 320 executes the one or more actions 322 to mitigate the real-world event via one or more node-oriented operations.

Importantly, configuration file 244 can be updated dynamically during execution of firmware application 242 to modify the operational behavior of the node without updating firmware application 242. In particular, upon receiving an updated configuration file 244 including updated modes 330, configuration engine 310 reconfigures conditions 302 and actions 322 in the manner described above based on those updated modes 330 without needing to reboot the node and/or reinitialize firmware application 242.

In one embodiment, configuration file 244 may indicate specific "active" conditions 302 that are currently mapped to one or more actions 322 and other "inactive" conditions 302 that are not currently mapped to any actions 322. Similarly, configuration file 244 may indicate specific "active" actions 322 that are current mapped to one or more conditions 302 and other "inactive" actions 322 that are not currently mapped to any conditions 302.

One advantage of the technique described above is that the node where firmware application 242 executes can be reconfigured dynamically and without needing a firmware update. Accordingly, the node need not be brought offline and restarted and node downtime can therefore be limited. In addition, new code need not be generated to enhance the functionality of the node, which can reduce overhead. Different types of nodes that execute different types of firmware application can also be reconfigured based on the same configuration file 244, further reducing overhead involved with reconfiguring nodes. Finally, different configuration files can be generated quickly and easily in response to any customer feature request, allowing customer needs to be fulfilled quickly and in a responsive manner.

In one embodiment, the techniques described above may be implemented to dynamically configure a smart electric meter to disconnect electricity if the instantaneous amperage or voltage of that electricity exceeds a maximum value for a threshold amount of time. Further, the smart electric meter may be configured to reconnect the electricity after a reconnect interval up until a maximum number of reconnections is reached. The above behavior could be implemented, for example, via a mode 330 associated with a condition 302 that can be evaluated based on a real-time measurement of voltage or amperage. The mode 330 could include params 332 specifying the maximum value for the amperage or voltage, the threshold amount of time, the reconnect interval, and the maximum number of reconnections. The mode 330 could also include one rule 334 indicating the electricity should be disconnected until the reconnect interval elapses and another rule 334 indicating that the electricity should not be reconnected after the maximum number of reconnections is reached.

In another embodiment, the disclosed techniques may be implemented to dynamically configure a network device to mitigate a potential network attack upon determining that a maximum number of port scans has occurred. This behavior could be implemented, for example, via a mode 330 associated with a condition 302 that can be evaluated based on a count of how many port scans have occurred within a given time span. The mode 330 could include params 332 specifying the maximum number of port scans, and a set of rules 334 indicating that network traffic should be throttled for a throttling interval.

Configuring a Node to Respond to a Specified Event

Figure 4:
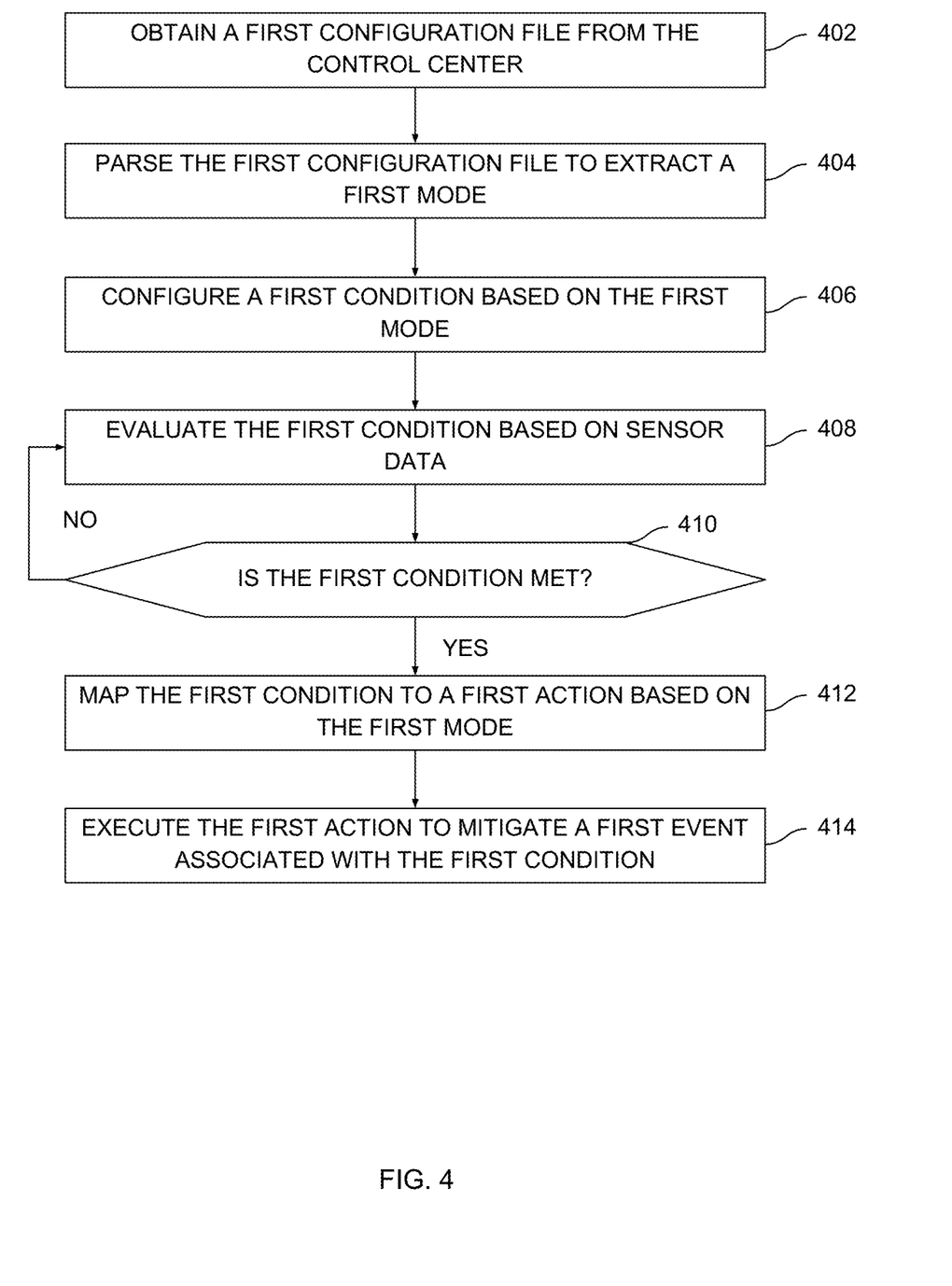
FIG. 4 is a flow diagram of method steps for configuring a node to respond to a specified event, according to various embodiments.

FIG. 4 is a flow diagram of method steps for configuring a node to respond to a specified event, according to various embodiments. Although the method steps are described in conjunction with the systems of FIGS. 1-3, persons skilled in the art will understand that any system configured to perform the method steps in any order falls within the scope of the present invention.

As shown, a method 400 begins at step 402, where a node included in network system 100 obtains a first configuration file from control center 130. The node can be any of border router nodes 112, MPD nodes 114, or BPD nodes 116. The node includes an instance of network subsystem 200 shown in FIG. 2. Control center 130 provides the node with the first configuration file to modify node operational behavior without updating node firmware. FIG. 3 illustrates an exemplary configuration file.

At step 404, a configuration engine within the node parses the first configuration file to extract a first mode. Configuration files can include any number of modes that define various operational characteristics for nodes. A given mode indicates one or more conditions that should be evaluated during node operation, a set of parameters according to which those conditions are evaluated, and at least one rule for mapping the one or more conditions to one or more actions that should be performed in response to each condition being met. FIG. 3 illustrates a configuration engine and exemplary modes.

At step 406, the configuration engine configures a first condition based on the first mode. In so doing, the configuration engine generates or updates the first condition to include specific parameter values set forth in the first mode. For example, suppose the first condition is defined as "A+B>C" and the first mode indicates that "C" should be equal to 10. The configuration engine would update the first condition to set the value of C equal to 10, thereby generating an updated first condition of "A+B>10." The values of "A" and "B" could be defined based on sensor data, as described below in conjunction with step 408. The configuration engine can configure conditions having any technically feasible complexity. In one embodiment, a condition assumes the form of an inequality that evaluates to a Boolean value. In another embodiment, a condition assumes the form of an equation that evaluates to an integer or floating-point value.

At step 408, an evaluation engine within the node evaluates the first condition based on sensor data captured by the node. The sensor data relates to the distribution of a resource. The evaluation engine evaluates the first condition by setting one or more values included in the first condition based on the sensor data. Returning to the example set forth above, the sensor data could indicate that "A" should be equal to 7 and "B" should be equal to 9. The evaluation engine would generate an updated first condition of "7+9>10." The evaluation engine evaluates this inequality to be true. FIG. 3 illustrates an evaluation engine and exemplary conditions.

At step 410, the evaluation engine determines whether the first condition is met. The first condition is met if the first condition evaluates to true, as set forth in the above example. If the evaluation engine determines that the first condition is not met, then the method 400 returns to step 408 and continues to evaluate the first condition based on updated sensor data. Otherwise, if the evaluation engine determines that the first condition is met, then the method 400 proceeds to step 412.

At step 412, a response engine within the node maps the first condition to a first action based on the first mode. The first mode sets forth a set of rules for mapping conditions to actions, as mentioned above. The response engine analyzes a first rule included in the first mode that corresponds to the first condition to determine the first action. The first rule may indicate a simple association between the first condition and the first action. For example, the first rule could indicate that if the first condition is met, then the first action should be executed. Alternatively, the first rule could include more complex logic that is evaluated to select between different actions. For example, the first rule could indicate that if the first condition is met and also evaluates to a first range of values, then the first action should be executed, but if the first condition is met and evaluates to a second range of values, then a second action should be executed. FIG. 3 illustrates a response engine and exemplary actions.

At step 414, the response engine executes the first action to mitigate a first event associated with the first condition. The first event is a real-world occurrence that the node detects based on the first condition. For example, the node could detect a voltage surge by evaluating a condition that quantifies the instantaneous voltage level in a power line and compares that voltage level to a threshold value. The response engine executes the first action to cause the node to compensate for, or otherwise address, the occurrence of the first event. For example, upon detecting the voltage surge, the node could disconnect the power line to prevent equipment that is coupled to the power line from being damaged.

The node performs the method 400 to configure and perform specific behaviors and can then repeat the method 400 with another configuration file to configure and perform other behaviors. In so doing, the node need not power down and restart to reinitialize execution of the firmware application, because the firmware application does not need to be modified to support new operational behavior.

In sum, embodiments of the invention include a technique for dynamically modifying the operational behavior of a node. The node includes a firmware application that analyzes sensor data to detect and respond to one or more events associated with the distribution of resources. During execution, the firmware application reads a configuration file that specifies a set of conditions. A given condition can be evaluated based on the sensor data to detect the occurrence of a corresponding event. The configuration file also specifies different actions that should be performed in response to different detected events. The configuration file can be dynamically updated during execution of the firmware application to modify the set of conditions the firmware application evaluates and the different actions to be performed when occurrences of specific events are detected. In addition, different versions of the firmware application that execute on different types of nodes can be configured based on one type of configuration file in order to apply similar modifications to the operational behavior of those different types of nodes. Accordingly, many different types of nodes can be dynamically updated to perform similar operations without needing to generate and deploy multiple firmware updates.

One technological advantage of the disclosed approach relative to the prior art is that the operational behavior of a node within a wireless network can be modified without having to bring the node offline. Accordingly, the node can be configured to detect a variety of different events and respond with a variety of different actions while continuing to operate. Another technological advantage of the disclosed approach relative to the prior art is that the operational behavior of the node can be modified without having to generate a firmware update. Accordingly, the overhead typically associated with generating firmware updates can be largely reduced. Yet another technological advantage of the disclosed approach relative to the prior art is that different types of firmware associated with different network devices can be configured based on one type of configuration file, thereby avoiding situations where different types of devices need to be configured separately to implement the same set of features. Yet another technological advantage of the disclosed approach relative to the prior art is that the control center can respond to customer feature requests quickly, given the simplicity with which node behavior can be modified. These technological advantages represent multiple technological advancements over prior art approaches.

1. Some embodiments include a computer-implemented method for modifying one or more operational characteristics of a node, the method comprising generating a first mode based on a first configuration file, wherein the first mode includes a first set of parameters and a first set of rules, generating a first condition based on the first set of parameters, determining that the first condition has been met based on first sensor data indicating an occurrence of a first event, wherein the first event is associated with distributing a resource at a first location, determining a first action corresponding to the first condition based on the first set of rules, and executing the first action to cause the node to perform one or more operations that modify how the resource is distributed at the first location in order to mitigate the first event.

2. The computer-implemented method of clause 1, further comprising generating a second mode based on a second configuration file, wherein the second mode includes a second set of parameters and the first set of rules, generating a second condition based on the second set of parameters, and determining that the second condition has not been met based on the first sensor data to contraindicate any occurrences of the first event.

3. The computer-implemented method of any of clauses 1-2, further comprising generating a second mode based on a second configuration file, wherein the second mode includes the first set of parameters and a second set of rules, determining a second action corresponding to the first condition based on the second set of rules, and executing the second action to cause the node to perform one or more additional operations that further modify how the resource is distributed at the first location in order to further mitigate the first event.

4. The computer-implemented method of any of clauses 1-3, wherein determining that the first condition is met comprises determining that a first sensor reading associated with distributing the resource at a first point in time exceeds a threshold value included in the first set of parameters.

5. The computer-implemented method of any of clauses 1-4, wherein the first event corresponds to a spike in resource consumption at the first location at the first point in time, and further comprising executing the first action to terminate the distribution of the resource at the first location.

6. The computer-implemented method of any of clauses 1-5, wherein determining that the first condition is met comprises determining that a first accumulated value associated with distributing the resource over a first time interval exceeds a threshold value included in the first set of parameters.

7. The computer-implemented method of any of clauses 1-6, wherein the first event corresponds to resource consumption at the first location exceeding a quota associated with the first time interval, and further comprising executing the first action to terminate the distribution of the resource at the first location.

8. The computer-implemented method of any of clauses 1-7, wherein determining that the first condition is met comprises determining that a first number of port scans associated with the node exceeds a threshold value included in the first set of parameters.

9. The computer-implemented method of any of clauses 1-8, wherein the first event corresponds to a network attack that targets a wireless network in which the node resides, and further comprising executing the first action to throttle access to at least one resource provided by the wireless network.

10. Some embodiments include a non-transitory computer-readable medium storing program instructions that, when executed by a processor, cause the processor to modify one or more operational characteristics of a node by performing the steps of generating a first mode based on a first configuration file, wherein the first mode includes a first set of parameters and a first set of rules, generating a first condition based on the first set of parameters, determining that the first condition has been met based on first sensor data indicating an occurrence of a first event, wherein the first event is associated with distributing a resource at a first location, determining a first action corresponding to the first condition based on the first set of rules, and executing the first action to cause the node to perform one or more operations that modify how the resource is distributed at the first location in order to mitigate the first event.

11. The non-transitory computer-readable medium of clause 10, further comprising the steps of generating a second mode based on a second configuration file, wherein the second mode includes a second set of parameters and the first set of rules, generating a second condition based on the second set of parameters, and determining that the second condition has not been met based on the first sensor data to contraindicate any occurrences of the first event.

12. The non-transitory computer-readable medium of any of clauses 10-11, further comprising the steps of generating a second mode based on a second configuration file, wherein the second mode includes the first set of parameters and a second set of rules, determining a second action corresponding to the first condition based on the second set of rules, and executing the second action to cause the node to perform one or more additional operations that further modify how the resource is distributed at the first location in order to further mitigate the first event.

13. The non-transitory computer-readable medium of any of clauses 10-12, wherein the step of determining that the first condition is met comprises determining that a first sensor reading associated with distributing the resource at a first point in time exceeds a threshold value included in the first set of parameters, wherein the first event corresponds to a spike in resource consumption at the first location at the first point in time, and further comprising executing the first action to terminate the distribution of the resource at the first location.

14. The non-transitory computer-readable medium of any of clauses 10-13, wherein the step of determining that the first condition is met comprises determining that a first accumulated value associated with distributing the resource over a first time interval exceeds a threshold value included in the first set of parameters, wherein the first event corresponds to resource consumption at the first location exceeding a quota associated with the first time interval, and further comprising executing the first action to terminate the distribution of the resource at the first location.

15. The non-transitory computer-readable medium of any of clauses 10-14, wherein the step of determining that the first condition is met comprises determining that a first number of port scans associated with the node exceeds a threshold value included in the first set of parameters, the first event corresponds to a network attack that targets a wireless network in which the node resides, and further comprising executing the first action to throttle access to at least one resource provided by the wireless network.

16. The non-transitory computer-readable medium of any of clauses 10-15, wherein the resource comprises electricity, and the resource is distributed via a power line to which the node is coupled.

17. The non-transitory computer-readable medium of any of clauses 10-16, wherein the resource comprises gas, and the resource is distributed via a gas line to which the node is coupled.

18. The non-transitory computer-readable medium of any of clauses 10-17, wherein the resource comprises water, and the resource is distributed via a water line to which the node is coupled.

19. Some embodiments include a system for modifying one or more operational characteristics of a node, comprising a memory storing a firmware application, and a processor that, when executing the firmware application, performs the steps of generating a first mode based on a first configuration file, wherein the first mode includes a first set of parameters and a first set of rules, generating a first condition based on the first set of parameters, determining that the first condition has been met based on first sensor data indicating an occurrence of a first event, wherein the first event is associated with distributing a resource at a first location, determining a first action corresponding to the first condition based on the first set of rules, and executing the first action to cause the node to perform one or more operations that modify how the resource is distributed at the first location in order to mitigate the first event.

20. The system of clause 19, wherein the node is coupled to a utility distribution infrastructure that distributes the resource at the first location, and wherein the resource comprises at least one of electricity, gas, and water.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A network device comprising:
one or more processors; and
a memory storing firmware that when executed by the one or more processors causes the network device to perform operations comprising:
   executing the firmware according to a configuration file, wherein the executing includes receiving, from a server, one or more commands updating the configuration file to become a modified configuration file; and
   executing the firmware according to the modified configuration file, wherein executing the firmware according to the modified configuration file includes:
      extracting a mode from the modified configuration file, the mode indicating a condition, a set of parameters, and a rule mapping the condition to an action;
      evaluating the condition based on one or more parameter values associated with the set of parameters; and
      in response to determining that the condition has been met, performing the action, wherein performing the action modifies how a resource is distributed at a location.

2. The network device of claim 1, further comprising:
a sensor; and
the operations further comprise setting a first parameter value of the one or more parameter values based on sensor data from the sensor.

3. The network device of claim 1, wherein the resource comprises electricity distributed via a power line coupled to the network device.

4. The network device of claim 1, wherein the resource comprises gas distributed via a gas line coupled to the network device.

5. The network device of claim 1, wherein the resource comprises water distributed via a water line coupled to the network device.

6. The network device of claim 1, wherein evaluating the condition comprises determining that a number of port scans associated with the network device exceeds a threshold value.

7. The network device of claim 1, wherein:
the condition indicates an event; and
the action mitigates the event.

8. The network device of claim 7, wherein:
the event corresponds to a network attack that targets a wireless network in which the network device resides; and
performing the action comprises throttling access to at least one distributed resource provided by the wireless network.

9. A method comprising:
executing, at a node, a firmware application based on a configuration file, wherein the executing includes receiving, at the node and from a server, one or more commands updating the configuration file to become a modified configuration file that includes a set of rules and a set of parameters; and
executing, at the node, the firmware application according to the modified configuration file, wherein executing the firmware application according to the modified configuration file includes:
   generating, at the node, a condition based on the set of parameters;

determining, at the node, that the condition has been met based on sensor data indicating an occurrence of an event, wherein the event is associated with distributing a resource at a location;

determining, at the node, an action corresponding to the condition based on the set of rules; and executing the action to cause the node to perform one or more operations that modify how the resource is distributed in order to mitigate the event.

10. The method of claim 9, wherein a first rule of the set of rules maps the condition to the action.

11. The method of claim 9, wherein determining that the condition has been met comprises evaluating a mathematical expression included in the condition.

12. The method of claim 9, wherein determining that the condition has been met comprises determining that a sensor reading associated with distributing the resource at a point in time exceeds a threshold value included in the set of parameters.

13. The method of claim 9, wherein:

the event corresponds to a spike in resource consumption at the location at a point in time; and executing the action comprises terminating distribution of the resource at the location.

14. The method of claim 9, wherein determining that the condition has been met comprises determining that an accumulated value associated with distributing the resource over a time interval exceeds a threshold value included in the set of parameters.

15. The method of claim 9, wherein:

the event corresponds to resource consumption at the location exceeding a quota associated with a time interval; and the action comprises terminating distribution of the resource at the location.

16. A non-transitory computer-readable medium storing program instructions that, when executed by a network device, cause the network device to perform operations comprising:

executing a firmware application according to a configuration file, wherein executing the firmware application according to the configuration file includes receiving, from a server, one or more commands updating the configuration file to become a modified configuration file that includes a rule and a set of parameters, the rule mapping a condition to an action; and executing the firmware application according to the modified configuration file, wherein executing the firmware application according to the modified configuration file includes:

determining one or more parameter values associated with the set of parameters;

evaluating an expression included in the condition based on the one or more parameter values;

determining that an event has occurred based on the evaluating of the expression, wherein the event is associated with distributing a resource at a location; and executing the action to modify how the resource is distributed in response to the event.

17. The non-transitory computer-readable medium of claim 16, wherein the operations further comprise setting a first parameter value of the one or more parameter values based on sensor data.

18. The non-transitory computer-readable medium of claim 16, evaluating the expression comprises:

determining whether an amount of the resource being distributed at a point in time exceeds a first threshold value included in the set of parameters; or determining that an accumulated amount of the resource distributed over a time interval exceeds a second threshold value included in the set of parameters.

19. The non-transitory computer-readable medium of claim 16, wherein:

the event corresponds to a network attack that targets a wireless network in which the network device resides; and executing the action comprises throttling access to at least one distributed resource provided by the wireless network.

20. The non-transitory computer-readable medium of claim 16, wherein the network device is not rebooted between receiving the one or more commands and executing the firmware application according to the modified configuration file.

* * * * *